Figure 1:
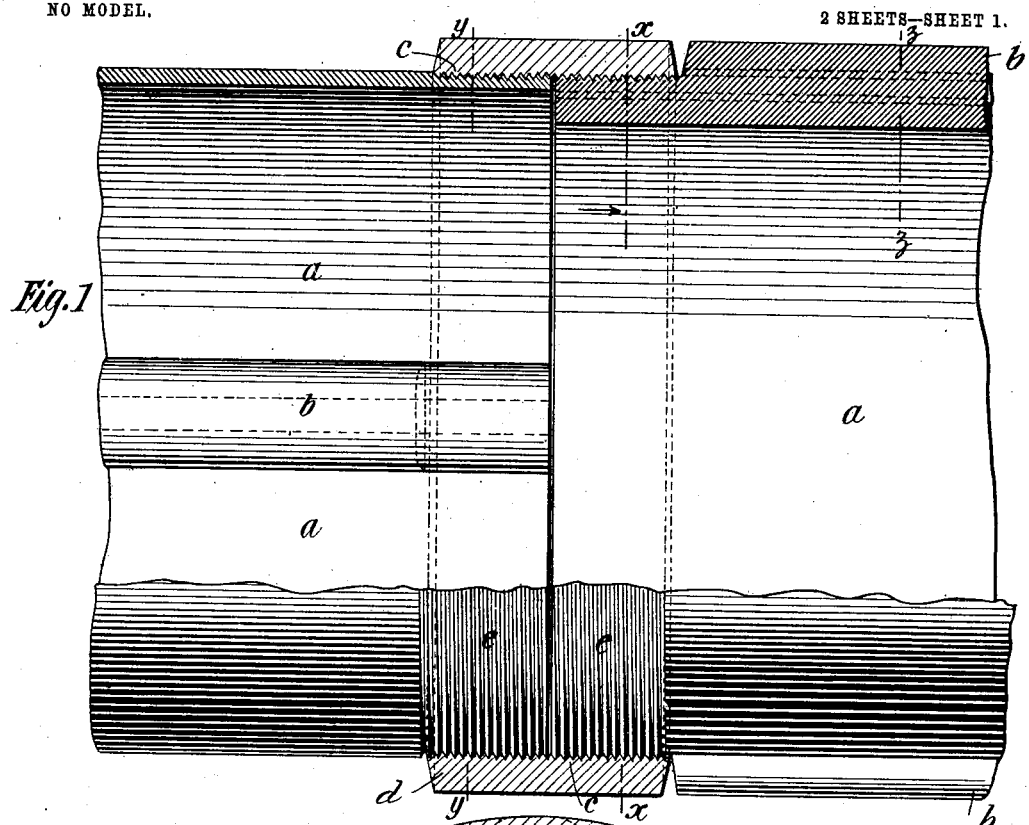

No. 761,067. PATENTED MAY 31, 1904.
T. A. GILLESPIE.
JOINT FOR LOCK BAR PIPES.
APPLICATION FILED AUG. 7, 1902.
NO MODEL. 2 SHEETS—SHEET 1.

Witnesses:
Raphaël Netter
Thos. J. Byrnes

Inventor
Thomas A. Gillespie
by Kerr, Page & Cooper, Attys.

THE NORRIS PETERS CO., PHOTO-LITHO., WASHINGTON, D. C.

No. 761,067. PATENTED MAY 31, 1904.
T. A. GILLESPIE.
JOIN FOR LOCK BAR PIPES.
APPLICATION FILED AUG. 7, 1902.
NO MODEL. 2 SHEETS—SHEET 2.
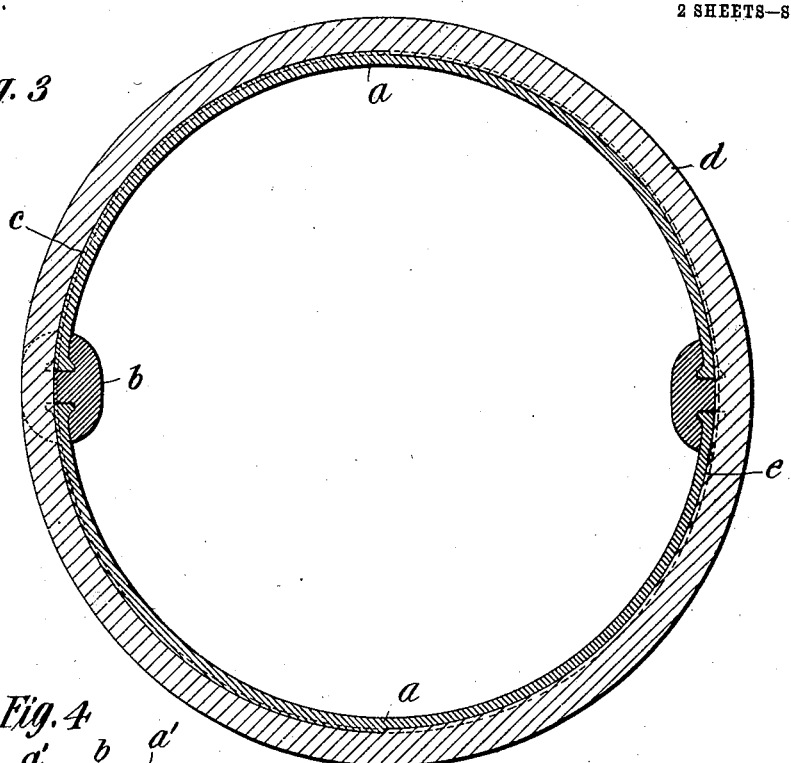
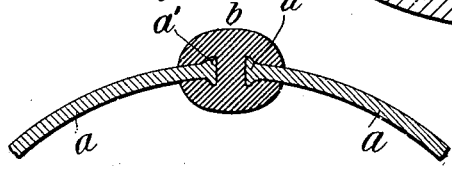
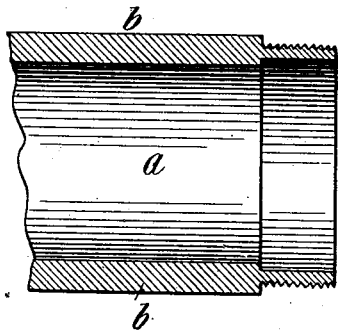
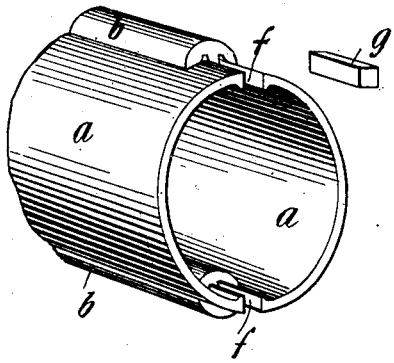
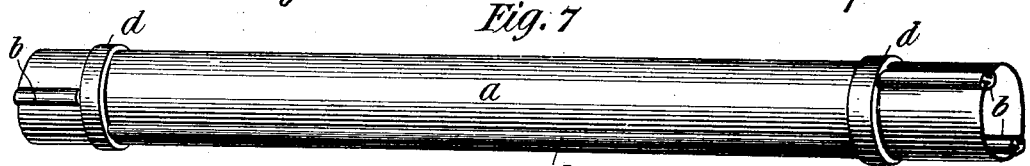
Witnesses: Thomas A. Gillespie, Inventor
Raphael Netter by Kerr Page & Cooper Attys
Thos. J. Byrnes No. 761,067. Patented May 31, 1904.

UNITED STATES PATENT OFFICE.

THOMAS A. GILLESPIE, OF WEST ORANGE, NEW JERSEY.

JOINT FOR LOCK-BAR PIPES.

SPECIFICATION forming part of Letters Patent No. 761,067, dated May 31, 1904.

Application filed August 7, 1902. Serial No. 118,700. (No model.)

*To all whom it may concern:*

Be it known that I, THOMAS A. GILLESPIE, a citizen of the United States, residing at West Orange, in the county of Essex and State of New Jersey, have invented a certain new and useful Improvement in Joints for Lock-Bar Pipes, of which the following is a specification, reference being had to the accompanying drawings, forming part of the same.

Lock-bar pipes are composed of two or more longitudinal plates of iron or steel having their edges upset to form a laterally-expanded rim, usually of dovetail shape in cross-section, connected together by longitudinal bars having grooves in their opposite sides, in which the upset edges are secured by compression, so as to form a tight union of the several parts. The lock-bars are relatively thicker than the plates, and their sides project along the inner and outer sides of the completed pipe.

The advantages of lock-bar over ordinary riveted pipe consist in the avoidance of riveted longitudinal seams between the edges of the plates, which weaken the pipe, and in the fact that they can be made in long sections, the usual length of a section being about thirty feet, while an ordinary riveted pipe-section is made up of several plates which vary in length from four to eight feet, according to the diameter of the pipe, and the lessening of friction by the great reduction of the number of transverse joints and the substitution of smooth lock-bars for the lines of longitudinal rivets. A serious objection, however, to the use of lock-bar pipes is the expense and difficulty of connecting the sections to each other, and it has been customary to do this by means of metal sleeves having a calking groove or recess at each end which requires to be calked with lead or other suitable material, lead, however, being commonly used. These sleeves are made with folds or bends which extend over the externally-projecting lock-bars and add to the expense and difficulty of making and calking the sleeves. The pipes are large, usually running from thirty inches in diameter up to much larger sizes, and the sleeves not only require a large amount of metal to make them, but have to be made with great care, while the operation of calking them requires a high degree of skill. The amount of lead required for the calking is so considerable as to add largely to the expense of using them. Moreover, a joint so made is relatively weak, which is a serious objection in case of long pipe-lines, where the amount of expansion and contraction is considerable, in that it tends to displace or loosen the lead or other packing and cause leaky joints. My improvement is designed to obviate these difficulties and to afford a cheaper, simpler, and stronger joint between the pipe-sections.

To enable others skilled in the art to make and use my invention, I will now describe it by reference to the accompanying drawings, in which—

Figure 2:
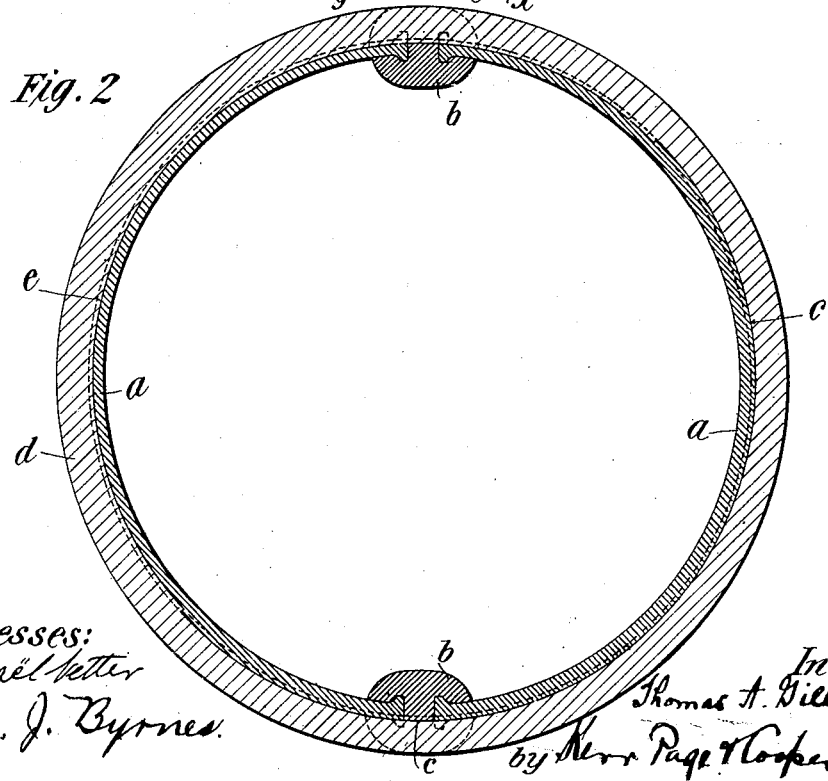

Figure 1 is a longitudinal view, partly in section, of my improved lock-bar pipe-joint. Figs. 2, 3, and 4 are cross-sections on the lines $x\, x$, $y\, y$, and $z\, z$ of Fig. 1. Figs. 5 and 6 show another way of making my improved joint. Fig. 7 is a view of several sections of pipe united with my improved joint.

Each section of pipe is composed of two or more longitudinal plates $a$, the edges of which are upset into an approximately dovetail shape $a'$. The plates are joined together by lock-bars $b$, having grouped edges which receive the dovetails $a'$ of the plates. The overlapping edges of the lock-bars are pinched or upset around the dovetails $a'$ of the plates. In ordinary lock-bar pipe the thick lock-bars extend to the ends of the pipe-sections; but in making my improved joint I turn down or plane off the outer side of the ends of the lock-bars, as shown at $c$, so that the outside of the pipe shall be a perfect circle, as illustrated in Fig. 2, a sufficient distance back from the end to permit of the use of a screw-coupling sleeve $d$. The ends of the pipes are then screw-threaded, as shown at $e$, and are thus adapted to be united together by cylindrical coupling-sleeves, as shown in Fig. 1.

In Figs. 5 and 6 I show another way of preparing the pipe-sections for use with threaded coupling-sleeves. Here the pipe-sections are made with lock-bars which are shorter than the plates $a'$ a sufficient amount to leave room at the ends for the application of the coupling-threads. This leaves an open space of rectangular shape between the plates at the ends of the section, as shown at $f$, on opposite sides of the pipe. This space I fill by welding in a suitably-shaped piece of metal $g$, forming the outside of the end of the pipe into a circle, so that it may be threaded for use with the threaded coupling-sleeve $d$.

By my improvement I am enabled to avoid the use of the costly and troublesome sleeve and lead calking heretofore used, avoiding the danger of leaky joints due to their inability to resist the effect of expansion and contraction, and in lieu thereof obtain in my improvement a simpler, cheaper, and stronger joint. I am enabled to overcome the most serious difficulty experienced in the use of lock-bar pipe—namely, the difficulty and expense of properly uniting the sections. The extension of the lock-bars into the ends of the other sections, as shown in Fig. 1, strengthens the joint and stiffens the pipe-line.

If desired, the couplings $d$ may be welded to one end of the pipe-sections, with their projecting ends internally threaded to receive the smaller or externally-threaded ends of other sections, as will be understood. This I regard as an equivalent way of forming the joint. In any case the external ends of the lock-bars terminate back of the ends of the sections a sufficient distance to permit of the attachment of the coupling at the peripheral line of the pipe whether said lock-bars are planed off externally or are made shorter than the plates used in forming the pipe-section.

What I claim as my invention is—

1. A lock-bar pipe-line, in which the lock-bars terminate externally back of the ends of the sections, and the sections are connected together by threaded couplings arranged between the external ends of the lock-bars; substantially as and for the purposes described.

2. A lock-bar pipe-joint, in which the external ends of the lock-bars are reduced to the periphery of the pipe, and the pipe-sections are externally threaded at the reduced parts and are connected together by threaded coupling-sleeves; substantially as and for the purposes described.

THOMAS A. GILLESPIE.

Witnesses:
 THOS. D. HARRIS,
 Z. ROSENFIELD.